United States Patent
Majmundar et al.

(10) Patent No.: US 11,219,051 B2
(45) Date of Patent: Jan. 4, 2022

(54) PRE-EMPTIVE TRIGGERING FOR INTEGRATED ACCESS AND BACKHAUL FOR 5G OR OTHER NEXT GENERATION NETWORK

(71) Applicant: AT&T Intellectual Property I, L.P., Atlanta, GA (US)

(72) Inventors: Milap Majmundar, Austin, TX (US); Thomas Novlan, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 183 days.

(21) Appl. No.: 16/541,312

(22) Filed: Aug. 15, 2019

(65) Prior Publication Data
US 2021/0051695 A1    Feb. 18, 2021

(51) Int. Cl.
*H04W 72/12*   (2009.01)
*H04W 72/14*   (2009.01)
*H04W 72/04*   (2009.01)

(52) U.S. Cl.
CPC ... *H04W 72/1284* (2013.01); *H04W 72/0413* (2013.01); *H04W 72/14* (2013.01)

(58) Field of Classification Search
CPC ............. H04W 72/1284; H04W 72/14; H04W 72/0413
See application file for complete search history.

(56) References Cited

U.S. PATENT DOCUMENTS

| | | | |
|---|---|---|---|
| 2010/0080139 A1* | 4/2010 | Palanki | H04W 4/06 370/252 |
| 2010/0097978 A1* | 4/2010 | Palanki | H04B 7/2606 370/315 |
| 2010/0167743 A1* | 7/2010 | Palanki | H04W 72/02 455/436 |
| 2010/0260096 A1* | 10/2010 | Ulupinar | H04W 76/12 370/315 |
| 2011/0096701 A1* | 4/2011 | Lin | H04L 1/0001 370/280 |
| 2011/0111693 A1* | 5/2011 | Nakao | H04L 1/1887 455/9 |

(Continued)

OTHER PUBLICATIONS

X. Duan, D. Zhang and X. Li, "An Improved Approach of Sending BSR and SR Based on MAC Layer in LTE System," 2011 International Conference on Business Computing and Global Informatization, Shanghai, China, 2011, pp. 520-523 (Year: 2011).*

(Continued)

*Primary Examiner* — Ayaz R Sheikh
*Assistant Examiner* — Tarell A Hampton
(74) *Attorney, Agent, or Firm* — Amin, Turocy & Watson, LLP

(57) ABSTRACT

In a 5G network, a pre-emptive scheduling request (SR) and a pre-emptive buffer status report (BSR) can be used to reduce the latency of data transmissions on the upstream of a multi-hop integrated access and backhaul (IAB) network from the user equipment UE to the IAB-donor node. A centralized unit (CU) can uniformly ensure that the pre-emptive SR/BSR feature is turned on or off across the entire IAB network regardless of which vendor provides the IAB nodes. Additionally, a message can be sent from a gNodeB to the CU to the IAB node to indicate whether the pre-emptive SR/BSR triggering feature is turned on or off.

20 Claims, 12 Drawing Sheets

(56) References Cited

U.S. PATENT DOCUMENTS

| | | | | |
|---|---|---|---|---|
| 2018/0092121 | A1* | 3/2018 | Hessler | H04W 72/1263 |
| 2018/0206176 | A1* | 7/2018 | Panteleev | H04W 76/14 |
| 2019/0159277 | A1* | 5/2019 | Zhu | H04W 88/04 |
| 2020/0008218 | A1* | 1/2020 | Shih | H04W 80/02 |
| 2020/0029353 | A1* | 1/2020 | Xu | H04W 72/1284 |
| 2020/0146109 | A1* | 5/2020 | Majmundar | H04W 76/11 |
| 2020/0178292 | A1* | 6/2020 | Kim | H04W 72/042 |

OTHER PUBLICATIONS

Y. Gao and G. Liu, "Two-Level Buffer State Report Scheme for 3GPP LTE System," 2009 5th International Conference on Wireless Communications, Networking and Mobile Computing, Beijing, China, 2009, pp. 1-5, (Year: 2009).*

D. Calin and B. H. Kim, "LTE application and congestion performance," in Bell Labs Technical Journal, vol. 18, No. 1, pp. 5-25, Jun. 2013, (Year: 2013).*

"3GPP TR 38.874 V16.0.0: Study on Integrated Access and Backhaul." 3rd Generation Partnership Project; 3GPP TR 38.874 V16.0.0 (Dec. 2018) Dec. 2018; 111 pages.

* cited by examiner

PRE-EMPTIVE TRIGGERING FOR INTEGRATED ACCESS AND BACKHAUL FOR 5G OR OTHER NEXT GENERATION NETWORK

TECHNICAL FIELD

This disclosure relates generally to pre-emptive triggering integrated access and backhaul networks for a 5G new radio (NR) networks. For example, this disclosure relates to pre-emptive scheduling requests and buffer status reports for integrated access and backhaul for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating pre-emptive triggering for integrated access and backhaul networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
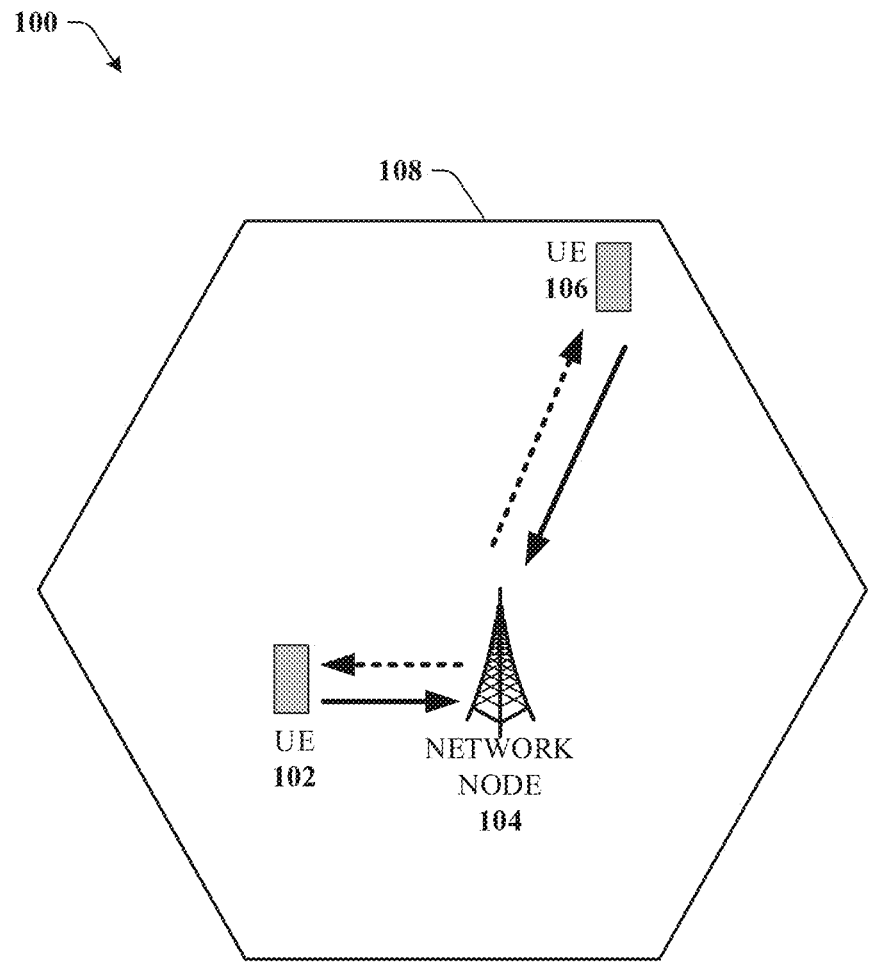
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate pre-emptive triggering for integrated access and backhaul networks for a 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate pre-emptive triggering for integrated access and backhaul networks for a 5G network. Facilitating pre-emptive triggering for integrated access and backhaul networks for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

The decision to trigger a pre-emptive scheduling request (SR) or buffer status report (BSR) and the actions taken by an integrated access and backhaul (IAB) node upon receiving a pre-emptive SR/BSR can be left up to implementation, such that each individual IAB node can decide independently whether or not to turn on the pre-emptive SR/BSR functionality for latency-sensitive traffic. Furthermore, there is currently no central mechanism being designed to control the functionality of pre-emptive SR/BSR triggering. This also means that when an operator's network has IAB nodes from different vendors, there is no way for an operator to ensure that pre-emptive SR/BSR triggering is turned on or off. Even though the actual triggering and actions taken related to pre-emptive SR/BSR can be performed in a proprietary manner by each IAB vendor, there can be certain scenarios in which an operator or gNB-centralized unit (CU) may want the pre-emptive SR/BSR to be turned off. Currently, there is no solution to turn off pre-emptive SR/BSR if needed. One situation where the pre-emptive SB/BSR can be turned off is to test the feature to assess its performance impact. Another reason could be to turn it off in order to troubleshoot some performance features in the network. Still another reason could be that a gNB-CU could be operating across a pool of IAB nodes that are manufactured by different vendors, and the vendors' implementation of this feature may not be consistent with each other, causing some performance issues in one part of the network versus another. Yet another reason for the gNB-CU to consider turning off pre-emptive SR/BSR is wastage of radio resources. If the IAB node triggers pre-emptive SR/BSR prematurely, it can receive grants from its parent node before it has received data from its child node. This can cause allocated radio resources to go unutilized causing wastage. If a gNB-CU determines that an IAB node is causing too much wastage of resources, due to premature pre-emptive SR/BSR triggering, it can turn of the feature.

In one embodiment, for the gNB-CU-CP to control the pre-emptive SR/BSR triggering feature, it is proposed that a message can be sent from the gNB-CU-CP to the IAB node to indicate whether the pre-emptive SR/BSR triggering feature is turned on or off. The indication can apply to all bearers or backhaul RLC channels supported by the IAB node, and/or can be indicated separately for each bearer or backhaul RLC channel on whether N:1 or 1:1 bearer mapping is supported in the network. In another embodiment, the message to turn on/off (e.g., active/inactive) the pre-emptive SR/BSR feature, from the gNB-CU-CP to the IAB node, can be delivered via a message on the F1-AP interface to the donor unite (DU) residing on the IAB node. In this case, since this message is not specifically related to a particular UE, this F1-AP message can be a non-UE-associated F1-AP message. In another embodiment, it is also possible that the gNB-CU-CP can send such a message to the MT residing on the IAB node. In this case, this message would be sent via RRC signaling to the mobile terminal (MT) of the IAB node. In another embodiment, the configuration of the pre-emptive SR/BSR feature can be provided via higher layer signaling, but the indication of the use of the feature at a child IAB node can be sent dynamically or semi-persistently via downlink control information (DCI) or media access control (MAC) control element (CE). This can be beneficial in case the pre-emptive SR/BSR feature utilizes different signaling (e.g. a new MAC CE) compared to the regular SR/BSR.

In one embodiment, described herein is a method comprising receiving, by a first wireless network device comprising a processor from a second wireless network device, scheduling request data representative of a scheduling request to send data via an uplink channel of a wireless network. In response to the receiving the scheduling request data, the method can comprise, sending, by the first wireless network device, the scheduling request data to a third wireless network device. Additionally, in response to the sending the scheduling request data to the third wireless network device, the method an comprise receiving, by the first wireless network device from the third wireless network device, uplink grant data representative of a grant for the second wireless network device to send the data to the third wireless network device via the first wireless network device.

According to another embodiment, a system can facilitate receiving, by a first node device of a wireless network from a mobile device of the wireless network, scheduling request data representative of a scheduling request to transmit packet data. In response to the receiving the scheduling request data, the system can facilitate transmitting the scheduling request data to a second node device of the wireless network. Furthermore, in response to the transmitting the scheduling request data to the second network node device, the system can comprise receiving grant data representative of a grant for the mobile device to transmit the packet data to the second network node device.

According to yet another embodiment, described herein is a machine-readable storage medium that can perform the operations comprising facilitating receiving, from a mobile device of a wireless network, scheduling request data representative of a request to send packet data. In response to the facilitating the receiving the scheduling data, the machine-readable storage medium can perform the operations comprising facilitating sending the scheduling data to a network node device. Furthermore, in response to the facilitating the sending the scheduling data to the network node device, the machine-readable storage medium can perform facilitating receiving uplink grant data representative of a grant to send the packet data to the network node device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000, etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
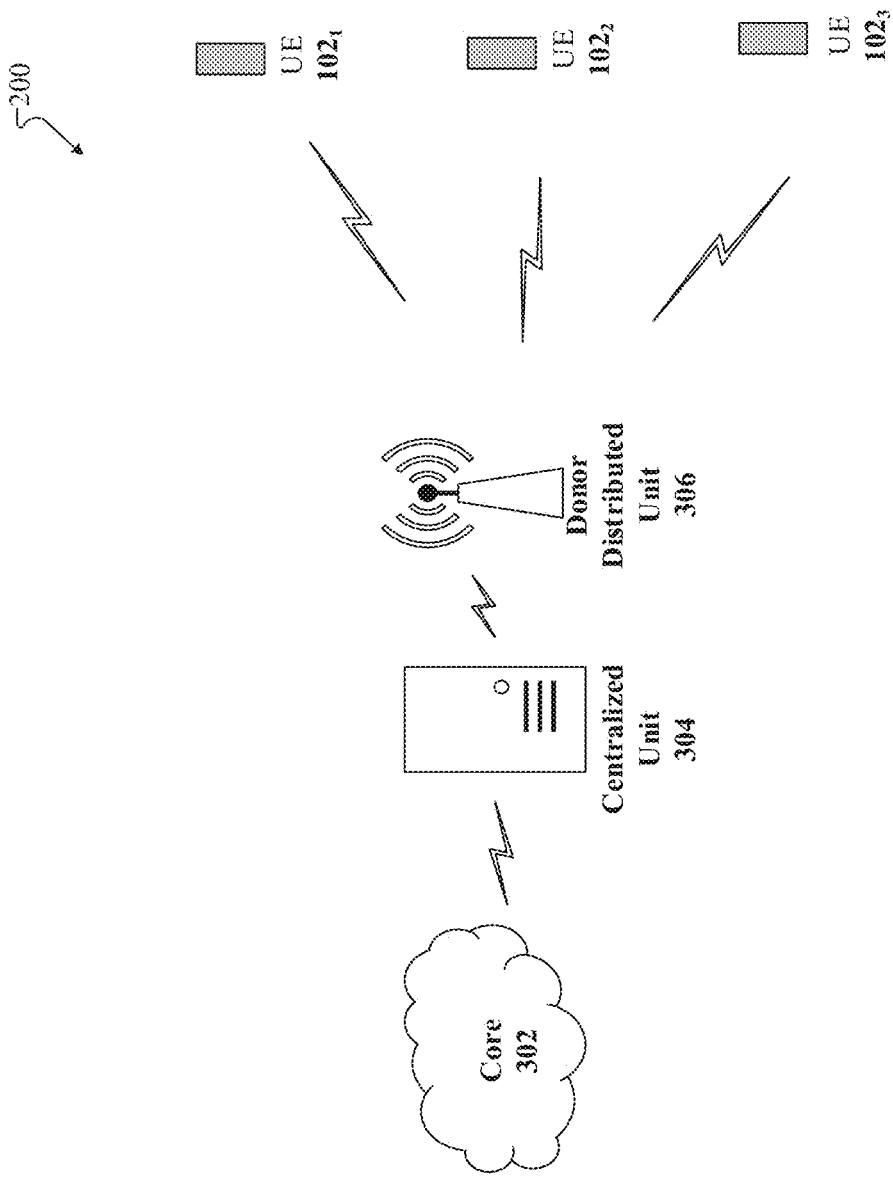
FIG. 2 illustrates an example schematic system block diagram of a new radio access architecture according to one or more embodiments.

Referring now to FIG. 2, illustrated is an example schematic system block diagram 200 of a new radio access architecture according to one or more embodiments. 3GPP NR-based 5G mobile networks can be deployed using a split RAN protocol architecture such that on the user plane the packet data convergence protocol (PDCP) sublayers can reside at a centralized unit (CU) 304, while the radio link control (RLC), media access control (MAC), and physical layer (PHY) layers can reside at the distributed unit (DU) 306. User plane data can be carried on data radio bearers (DRBs) that traverse the above described user plane RAN protocol architecture. On the control plane, signaling radio bearers (SRBs) can be set up to carry control messages from the radio resource control (RRC) layer, also utilize the packet data control protocol (PDCP) layer at the CU, and are further carry the control messages down through the RLC, medium access control (MAC), and physical (PHY) layers at the DU 306 to be delivered to the UE 102 over the air interface. Each network user can be allocated multiple DRBs and SRBs by the network. The network interface between the CU 304 and DU 306 can be called the F1 interface per 3GPP specifications.

Figure 3:
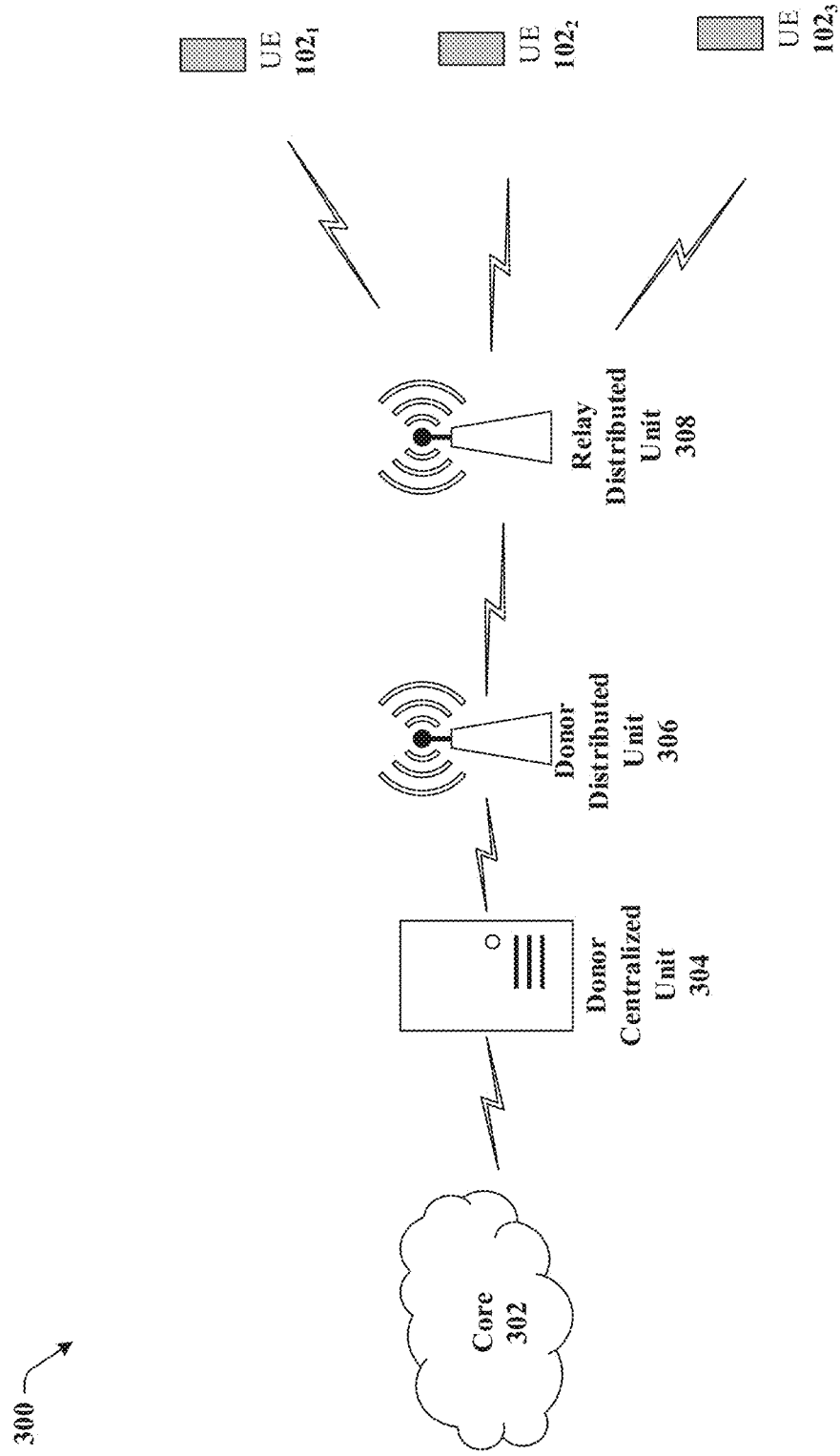
FIG. 3 illustrates an example schematic system block diagram of integrated access and backhaul links according to one or more embodiments.

Referring now to FIG. 3, illustrated is an example schematic system block diagram of integrated access and backhaul links according to one or more embodiments. An IAB feature can enable future cellular network deployment scenarios and applications to the support wireless backhaul and relay links enabling flexible and very dense deployment of NR cells without the need for densifying the transport network proportionately.

Due to the expected larger bandwidth available for NR compared to LTE (e.g., mmWave spectrum) along with the native deployment of massive MIMO or multi-beam systems in NR, IAB links can be developed and deployed. This can allow easier deployment of a dense network of self-backhauled NR cells in a more integrated manner by building upon many of the control and data channels/procedures defined for providing access to UEs.

For example, the network 300, as represented in FIG. 3 with integrated access and backhaul links, can allow a relay node to multiplex access and backhaul links in time, frequency, and/or space (e.g., beam-based operation). Thus, FIG. 3 illustrates a generic IAB set-up comprising a core network 302, a centralized unit 304, donor distributed unit 306, relay distributed unit 308, and UEs 1021, 1022, 1023.

The donor distributed unit 306 (e.g., access point) can have a wired backhaul with a protocol stack and can relay the user traffic for the UEs $102_1$, $102_2$, $102_3$ across the IAB and backhaul link. Then the relay distributed unit 308 can take the backhaul link and convert it into different strains for the connected UEs $102_1$, $102_2$, $102_3$. Although FIG. 3 depicts a single hop (e.g., over the air), it should be noted that multiple backhaul hops can occur in other embodiments.

Figure 4:
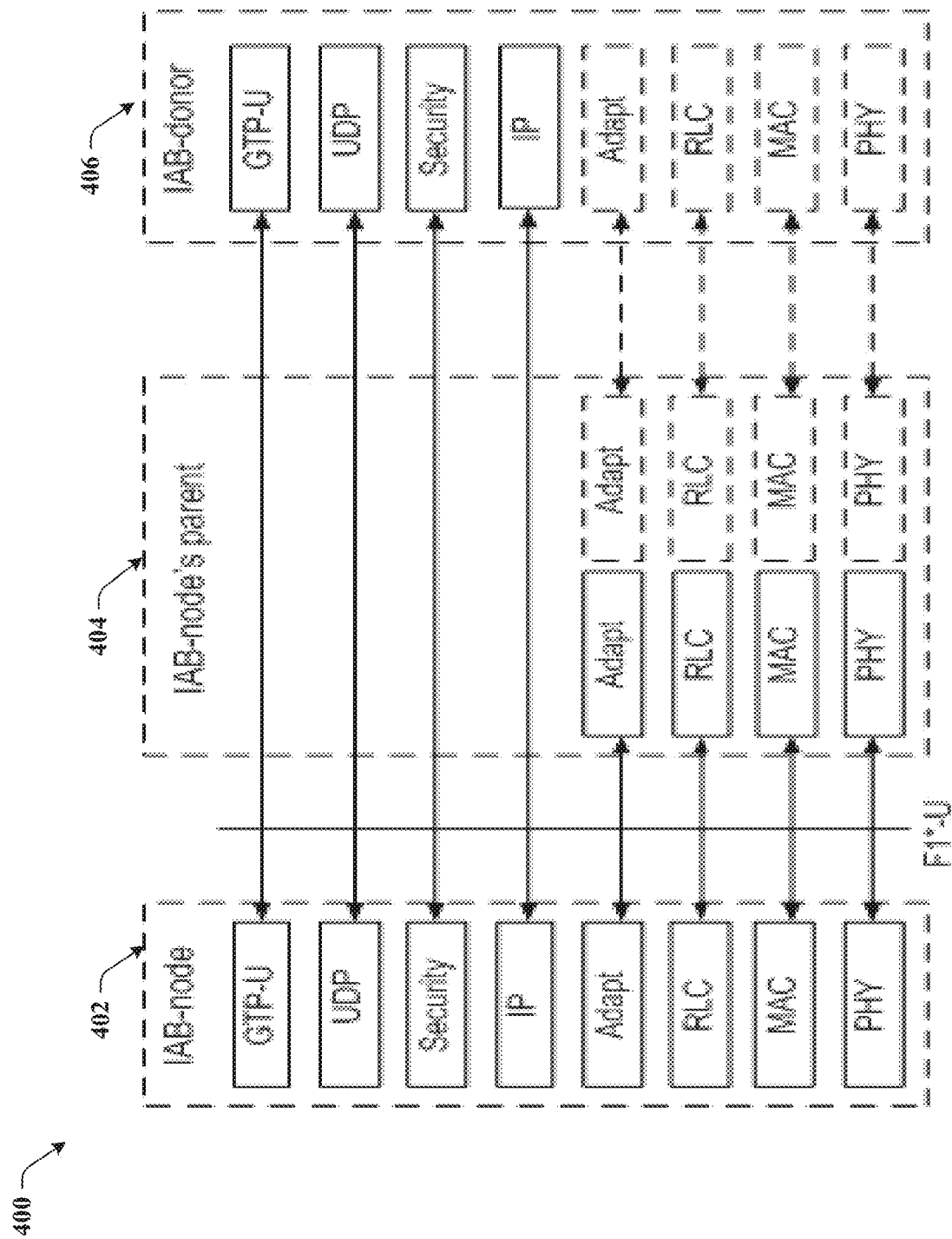
FIG. 4 illustrates an example user-plane protocol stack according to one or more embodiments.

Referring now to FIG. 4, illustrated is an example user-plane protocol stack 400 according to one or more embodiments. FIG. 4 depicts a new protocol stack layer, currently called an adaptation layer. The adaptation layer at each IAB node 402, 404 can perform routing of packets across the IAB backhaul network. It can also perform a many-to-one mapping of UE bearers into a radio link control (RLC) channel across an IAB hop.

As depicted in FIG. 4, the protocol stack from the mobile termination (MT) of a serving IAB node 402 to the distributed unit (DU) of the donor IAB node 406 can comprise a general packet radio services tunneling protocol (GTP-U) layer, a user datagram protocol (UDP) layer, a security layer, an internet protocol (IP) layer, an adaption (adapt) layer, a radio link control (RLC) layer, a media access control (MAC) layer, and a physical (PHY) layer. The adapt layer can perform a routing function from one IAB node (e.g., IAB node 402) to the IAB node parent 404, via the adapt layer, while also communicating via the RLC, MAC, and/or PHY layers. The IAB node parent 404 can then communicate this data to the donor IAB node 406.

Figure 5:
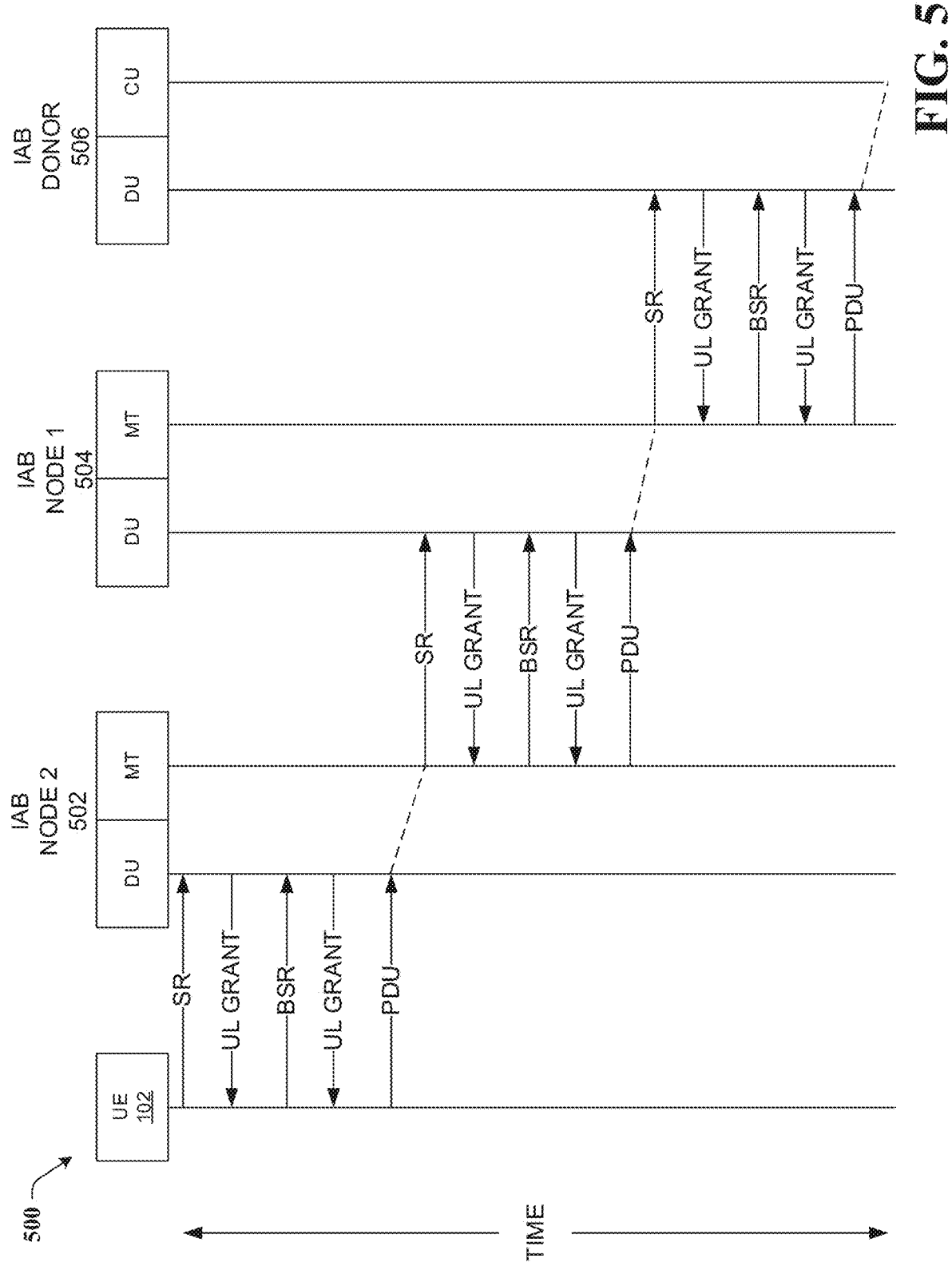
FIG. 5 illustrates an example schematic system block diagram of a data sequencing process according to one or more embodiments.

Referring now to FIG. 5 illustrated is an example schematic system block diagram of a data sequencing process 500 according to one or more embodiments. When a UE 102 has data to send, it can send a scheduling request to the DU of IAB node 502 indicating that the UE 102 has data to send. In response, the IAB node 502 can then issue an uplink (UL) grant requesting how much data the UE 102 needs to send. Thereafter, the UE 102 can send its BSR to the IAB node 502 to indicate to the IAB node 502 how much data the UE 102 intends to send to the IAB node 502. Based on this information, the IAB node 502 can issue a grant to the UE 102 based on the size of the data (e.g., UE 102 grant is sized according to how much data is in the BSR). Then, the UE 102 can transmit its data on the uplink. The IAB node 502 can then begin this same process with another IAB node 504 to transmit the data from the UE 102 to the IAB node 504. Additionally, the IAB node 504 can complete the same process again to transmit the original data from the UE 102 to the IAB donor node 506. Because this transaction can occur over multiple hops, at each hop, the DU of the IAB node can receive the data originally transmitted from the UE 102 and the MT of the IAB node can send the data originally transmitted from the UE 102 to another IAB node or the IAB donor node 506. Thus, the IAB node 504 can send corresponding scheduling requests to its parent node (e.g., IAB donor node 506), the IAB donor. However, this is performed only after the DU of the IAB node 504 has granted the data exchange from its child IAB node (e.g., IAB node 502).

Figure 6:
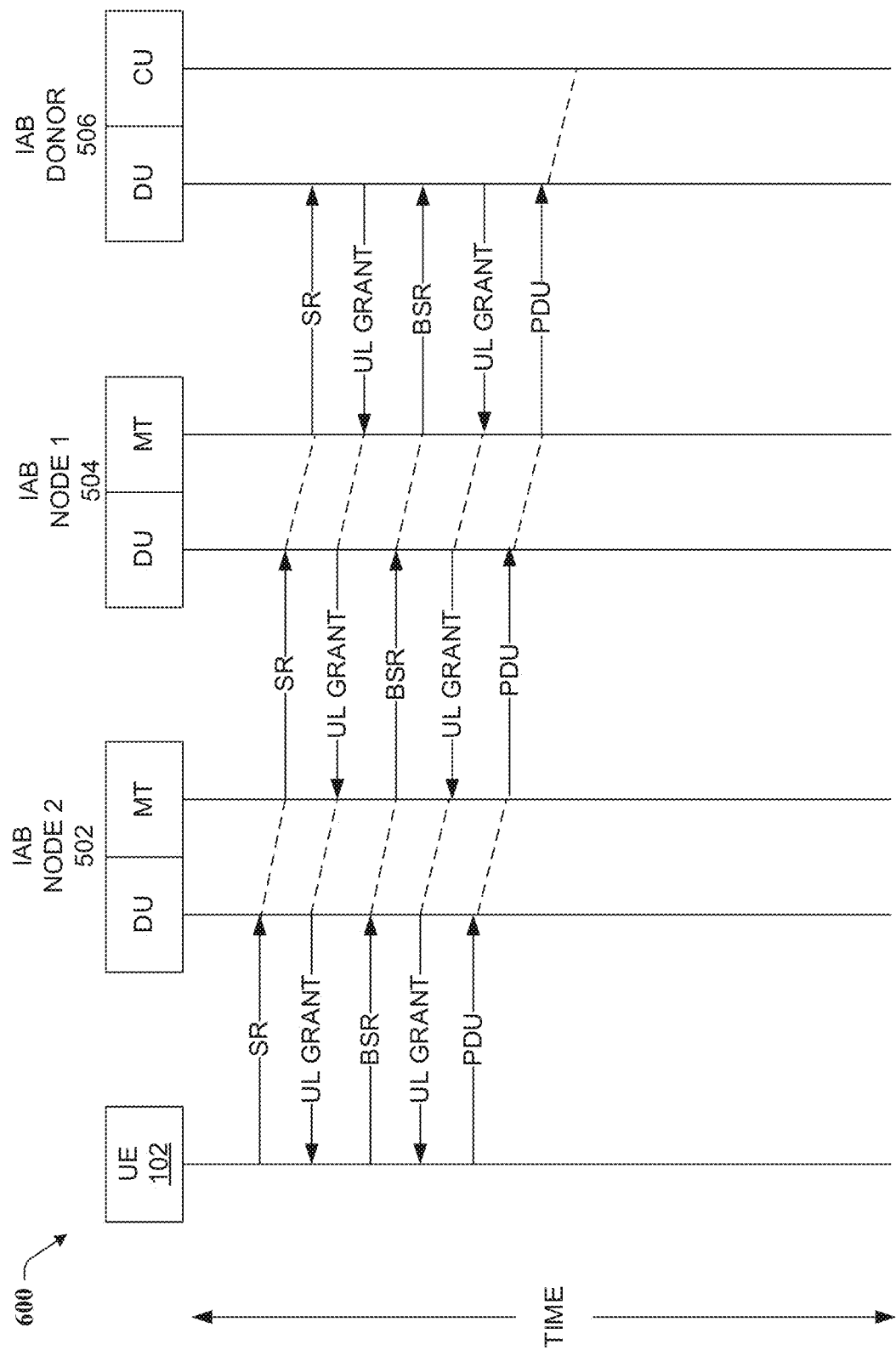
FIG. 6 illustrates an example schematic system block diagram of a pre-emptive data sequencing process according to one or more embodiments.

Referring now to FIG. 6 illustrated is an example schematic system block diagram of a pre-emptive data sequencing process 600 according to one or more embodiments. However, as depicted in FIG. 6, this can be done in less time (e.g., via a different message sequencing pattern) instead of waiting for a disposition at each individual node. For example, the IAB node 502 can send the original SR from the UE 102 to the IAB node 504 without waiting for the entire transaction to occur between the UE 102 and the IAB node 502. Likewise, the IAB node 504 can send the original SR from the IAB node 502 to the IAB donor node 506 without waiting for the entire transaction to occur between the IAB node 504 and the IAB node 502, and so on and so forth with regards to the UL grants, BSR and PDUs at each IAB node. Thus, the time to complete the transaction between the UE 102 and the IAB donor 506 is less for FIG. 6 than it is for FIG. 5, which can generate system efficiencies.

Figure 7:
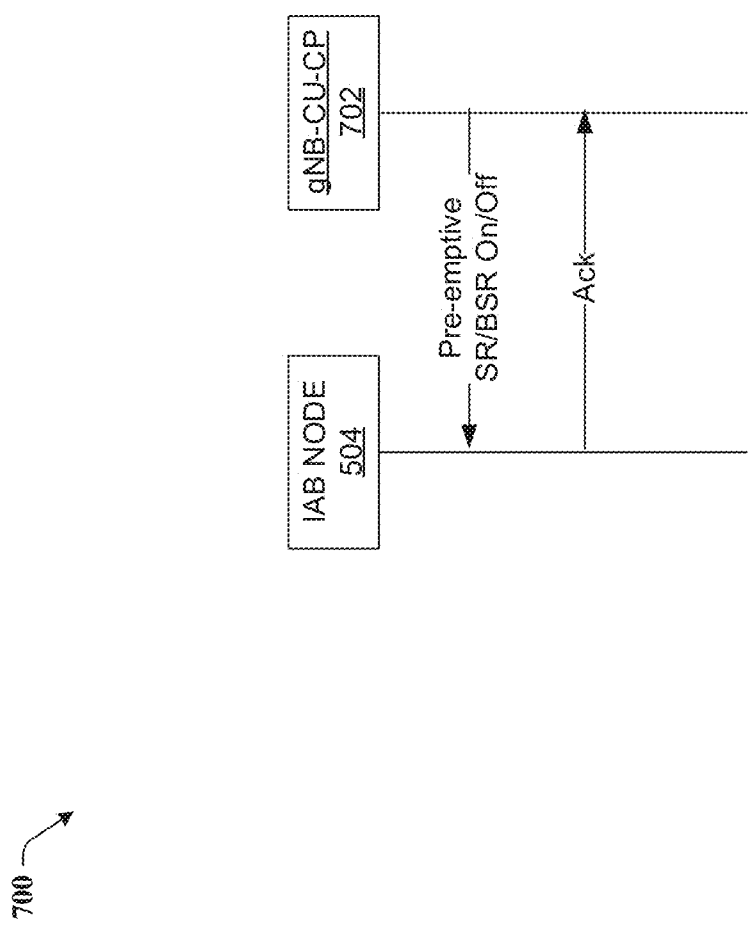
FIG. 7 illustrates an example schematic system block diagram that facilitates messaging for pre-emptive data processes according to one or more embodiments.

Referring now to FIG. 7, illustrated is an example flow diagram of a system 700 that facilitates messaging for pre-emptive data processes according to one or more embodiments. In another embodiment, an IAB node 502, 504, 506 can wait to send a pre-emptive trigger, it can send it immediately, or it can send it based on a predetermined period of time. Consequently, the pre-emptive transmissions can be controlled accordingly. For example, in some scenarios the pre-emptive sequencing can be turned off if a feature needs to be tested for performance (e.g., turned off to determine if the pre-emptive sequencing does indeed provide a performance gain), if there is a performance issue and some variability needs to be minimized, or if an IAB node from a vendor is not performing well, the pre-emptive sequencing feature can be turned off such that the ill-performing IAB node does not utilize the pre-emptive sequencing feature. A gNB-CU-CP 702 can send a message to the JAB node 502, 504. For example, the gNB-CU-CP 702 can send an on/off indication to the JAB node 502, 504, and based on that, the IAB node 502, 504 can turn the pre-emptive sequencing feature one/off accordingly.

Thereafter, the JAB node 502, 504 can send an acknowledgement that it has received and/or complied with the message from the gNB-CU-CP 702. The pre-emptive sequencing feature can be controlled on a per JAB node 502 basis and/or on an aggregate JAB node 502, 504 basis. For example, based on machine learning, the gNB-CU-CP 702 (e.g., network node 104) can determine if a certain area of the JAB node hierarchy is not performing efficiently and/or if there are wasted resources and turn off the feature in a certain area of the JAB node hierarchy. The messaging can be over F1 access point (AP) directly to the DU and/or sent via a radio resource control (RRC) message to the MT of the JAB node 502, 504. There can also be a lower layer indication (e.g., layer 1 downlink control information (DCI) signaling or a layer 2 media access control (MAC) control element (CE) signaling), which is provided from the parent JAB node (e.g., JAB node 504) to the child JAB node (e.g., JAB node 502) to turn the feature on/off, thus giving the parent JAB node (e.g., JAB node 504) an opportunity to control the feature based on its perspective of the network performance.

Figure 8:
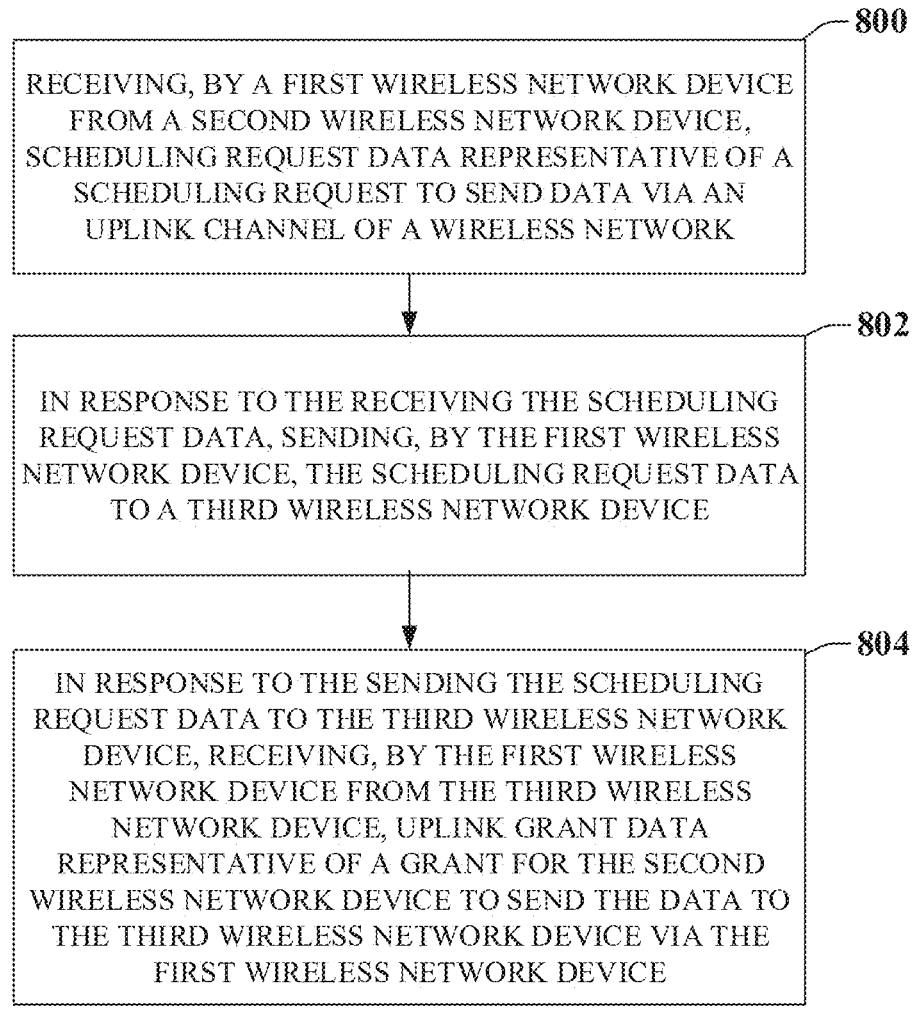
FIG. 8 illustrates an example flow diagram for a method for facilitating pre-emptive triggering for integrated access and backhaul networks network according to one or more embodiments.

Referring now to FIG. 8, illustrated is an example flow diagram for a method for facilitating pre-emptive triggering for integrated access and backhaul networks network according to one or more embodiments. At element 800, the method comprising receiving, by a first wireless network device (e.g., JAB node 502) comprising a processor from a second wireless network device (e.g., UE 102), scheduling request data representative of a scheduling request to send data via an uplink channel of a wireless network. In response to the receiving the scheduling request data, at element 802, the method can comprise, sending, by the first wireless network device (e.g., JAB node 502), the scheduling request data to a third wireless network device (e.g., JAB donor node 506). Additionally, at element 804, in response to the sending the scheduling request data to the third wireless network device (e.g., JAB donor node 506), the method an comprise receiving, by the first wireless network device (e.g., JAB node 502) from the third wireless network device (e.g., JAB donor node 506), uplink grant data representative of a grant for the second wireless network device (e.g., UE 102) to send the data to the third wireless network device (e.g., JAB donor node 506) via the first wireless network device (e.g., IAB node 502).

Figure 9:
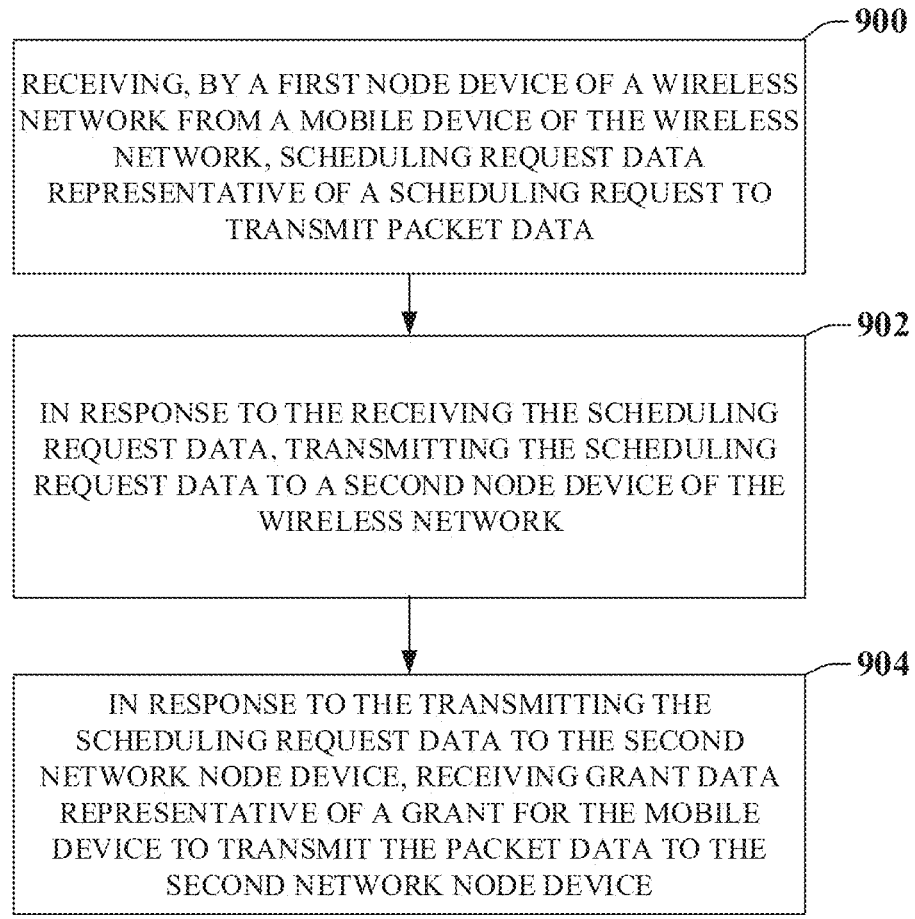
FIG. 9 illustrates an example flow diagram for a system for facilitating pre-emptive triggering for integrated access and backhaul networks network according to one or more embodiments.

Referring now to FIG. 9, illustrated is an example flow diagram for a system for facilitating pre-emptive triggering for integrated access and backhaul networks network according to one or more embodiments. At element 900, a system can facilitate receiving, by a first node device (e.g., IAB node 502) of a wireless network from a mobile device (e.g., UE 102) of the wireless network, scheduling request data representative of a scheduling request to transmit packet data. In response to the receiving the scheduling request data, at element 902, the system can facilitate transmitting (e.g., via the IAB node 502) the scheduling request data to a second node device of the wireless network. Furthermore, at element 904, in response to the transmitting (e.g., via the IAB node 502) the scheduling request data to the second network node device, the system can comprise receiving (e.g., via the IAB node 502) grant data representative of a grant for the mobile device (e.g., UE 102) to transmit the packet data to the second network node device.

Figure 10:
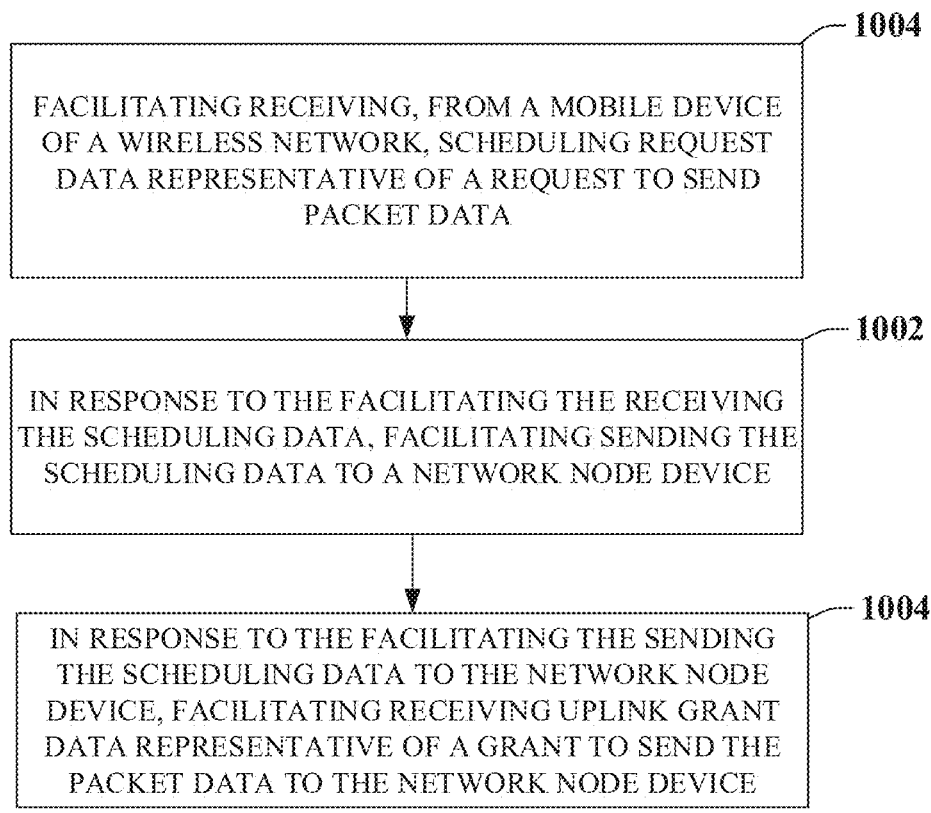
FIG. 10 illustrates an example flow diagram for a machine-readable medium for facilitating pre-emptive triggering for integrated access and backhaul networks network according to one or more embodiments.
Figure 11:
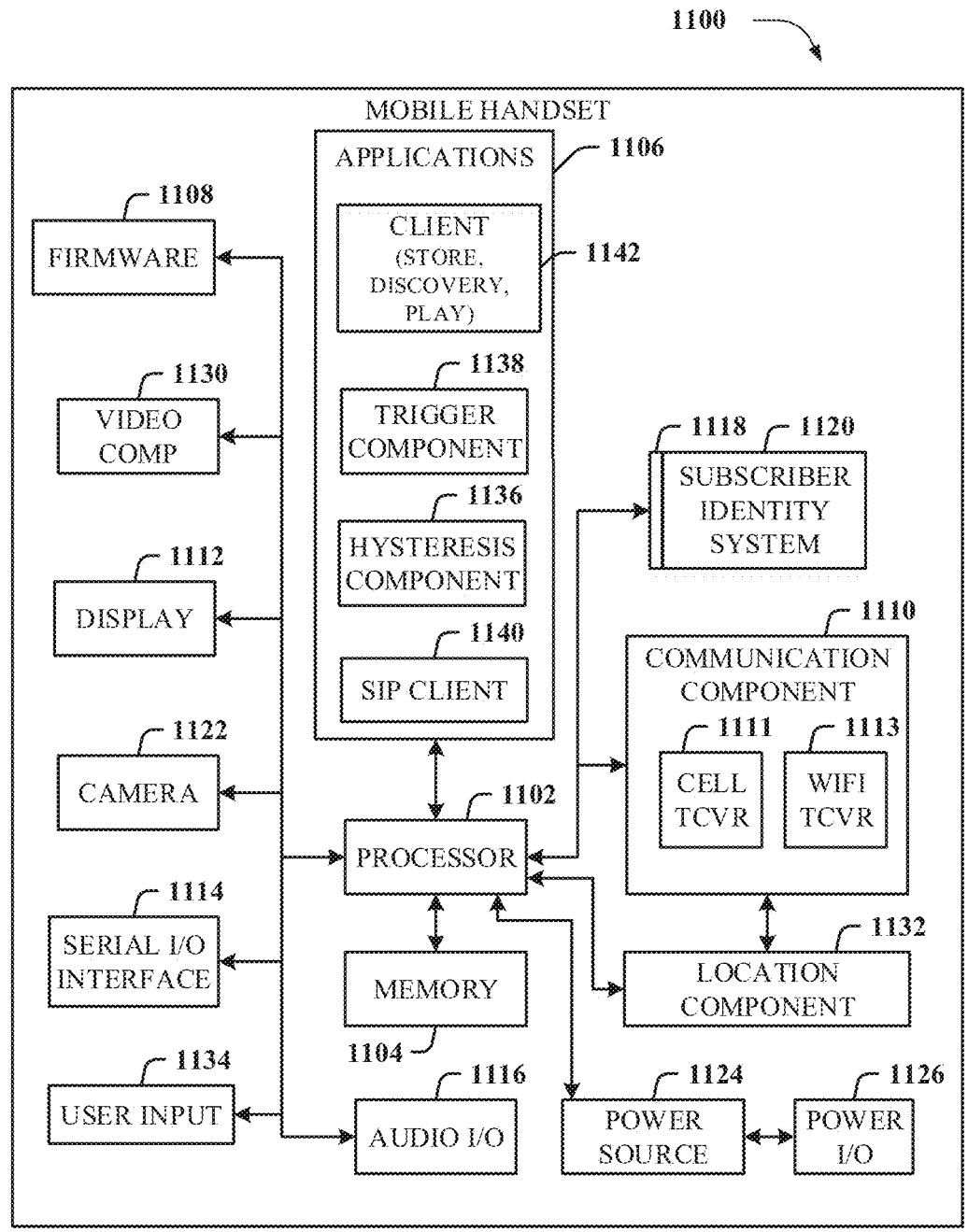
FIG. 11 illustrates an example block diagram of an example mobile handset operable to engage in a system architecture that facilitates secure wireless communication according to one or more embodiments described herein.

Referring now to FIG. 10, illustrated is an example flow diagram for a machine-readable medium for facilitating pre-emptive triggering for integrated access and backhaul networks network according to one or more embodiments. At element 1000, the machine-readable storage medium that can perform the operations comprising facilitating receiving, from a mobile device (e.g., UE 102) of a wireless network, scheduling request data representative of a request to send packet data. In response to the facilitating the receiving the scheduling data (e.g., by the IAB node 502), at element 1002, the machine-readable storage medium can perform the operations comprising facilitating sending (e.g., via the IAB node 502) the scheduling data to a network node device (e.g., the IAB donor node 506). Furthermore, in response to the facilitating the sending (e.g., via the IAB node 502) the scheduling data to the network node device (e.g., the IAB donor node 506), at element 1004, the machine-readable storage medium can perform facilitating receiving (e.g., via the IAB node 502) uplink grant data representative of a grant to send the packet data to the network node device (e.g., the IAB donor node 506).

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
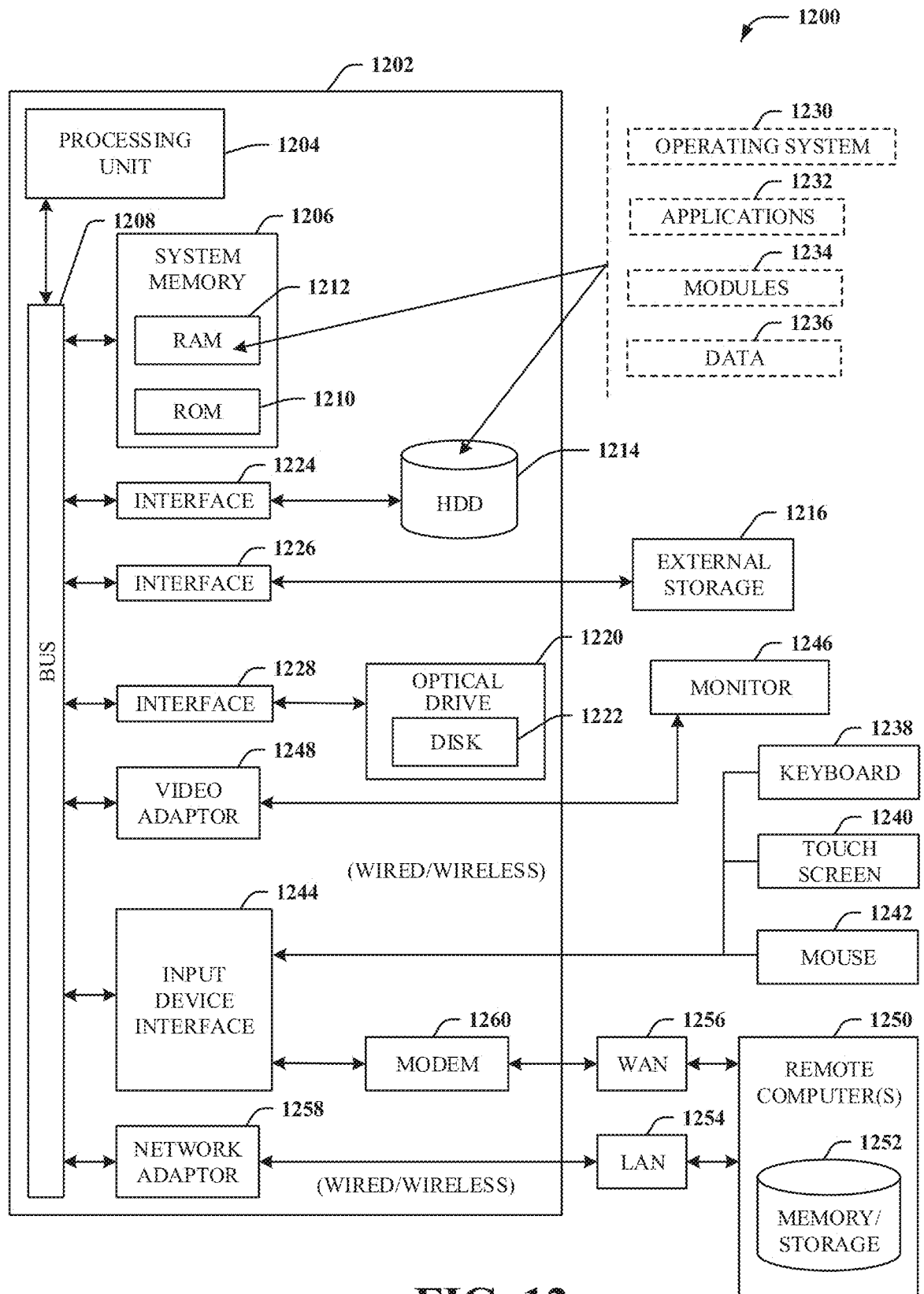
FIG. 12 illustrates an example block diagram of an example computer operable to engage in a system architecture that facilitates secure wireless communication according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a first network device comprising a processor from a second network device, scheduling request data representative of a scheduling request to send data via an uplink channel of a network;
in response to receiving the scheduling request data, sending, by the first network device, the scheduling request data to a third network device;
in response to sending the scheduling request data to the third network device, receiving, by the first network device from the third network device, uplink grant data representative of a grant for the second network device to send the data to the third network device via the first network device; and
receiving, by the first network device, message data representative of a status associated with a message sequencing pattern, wherein the status is an active status of the sequencing pattern capable of facilitating a sequencing of the data, and wherein the message data is received via a radio resource control signal.

2. The method of claim 1, wherein the third network device comprises an integrated access and backhaul device of the network.

3. The method of claim 1, further comprising:
receiving, by the first network device from a fourth network device, indication data representative of an indication to initiate a pre-emptive scheduling request; and
in response to receiving the indication data, initiating, by the first network device, the pre-emptive scheduling request.

4. The method of claim 1, further comprising:
in response to receiving the uplink grant data, sending, by the first network device, the uplink grant data to the second network device.

5. The method of claim 4, further comprising:
based on sending the uplink grant data to the second network device, receiving, by the first network device, buffer status data representative of a buffer status associated with the second network device.

6. The method of claim 1, further comprising:
receiving, by the first network device, message data representative of a status associated with a message sequencing pattern, wherein the message data is received via a downlink control data channel.

7. The method of claim 6, wherein the uplink grant data is first uplink grant data, wherein the grant is a first grant, and further comprising:
in response to sending buffer status data to the third network device, receiving, by the first network device from the third network device, second uplink grant data representative of a second grant for the second network device to send the data to the third network device via the first network device.

8. A system, comprising:
a processor; and
a memory that stores executable instructions that, when executed by the processor, facilitate performance of operations, comprising:
receiving, by a first node device of a network from a mobile device of the network, scheduling request data representative of a scheduling request to transmit packet data;
in response to receiving the scheduling request data, transmitting the scheduling request data to a second node device of the network;
in response to transmitting the scheduling request data to the second network node device, receiving grant data representative of a grant for the mobile device to transmit the packet data to the second network node device; and
receiving, by the first node device, message data representative of a status associated with a message sequencing pattern, wherein the status is an active status of the sequencing pattern capable of facilitating a sequencing of the data, and wherein the message data is received via a radio resource control signal.

9. The system of claim 8, wherein the operations further comprise:
in response to receiving the grant data, transmitting the grant data to the mobile device.

10. The system of claim 9, wherein the operations further comprise:
in response to transmitting the grant data, receiving buffer status data representative of an amount of the packet data to be transmitted to the second network node device.

11. The system of claim 10, wherein the operations further comprise:
based on receiving the buffer status data, transmitting the buffer status data to the second network node device.

12. The system of claim 11, wherein the grant data is first grant data, wherein the grant is a first grant, and wherein the operations further comprise:
in response to transmitting the buffer status data to the second network node device, receiving, from the network node device, second grant data representative of a second grant to be sent to the mobile device.

13. The system of claim 12, wherein the second grant is a capacity of a buffer associated with the second network node device.

14. The system of claim 12, wherein the operations further comprise:
in response to receiving the second grant data, transmitting third grant data associated with a capacity of the first network node device.

15. The system of claim 8, wherein the operations further comprise:
receiving message data representative of a status associated with a data sequencing pattern, wherein the status is an inactive status of the data sequencing pattern capable of facilitating a termination of a sequencing of the packet data, and wherein the message data is received via a media access control element.

16. A non-transitory machine-readable medium, comprising executable instructions that, when executed by a processor, facilitate performance of operations, comprising:
receiving, from a mobile device of a network, scheduling request data representative of a request to send packet data;
in response to receiving the scheduling data, sending the scheduling data to a network node device;
in response to sending the scheduling data to the network node device, receiving uplink grant data representative of a grant to send the packet data to the network node device; and
receiving message data representative of a status associated with a message sequencing pattern, wherein the status is an active status of the sequencing pattern capable of facilitating a sequencing of the data, and wherein the message data is received via a radio resource control signal.

17. The non-transitory machine-readable medium of claim 16, wherein the operations further comprise:
in response to receiving the uplink grant data, sending the uplink grant data to the mobile device.

18. The non-transitory machine-readable medium of claim 17, wherein the uplink grant data is first uplink grant data, and wherein the operations further comprise:
based on receiving of the first uplink grant data, facilitating sending second uplink grant data to the mobile device.

19. The non-transitory machine-readable medium of claim 16, wherein the operations further comprise:
receiving indicator data representative of an indication that a data sequencing pattern is active, and wherein receiving the indicator data comprises facilitating receiving the indicator data via an F1 access point interface device.

20. The non-transitory machine-readable medium of claim 19, wherein the operations further comprise:
in response to receiving of the indicator data, facilitating sending acknowledgement data to the network node device.

* * * * *